(12) United States Patent
Lee et al.

(10) Patent No.: US 8,366,122 B2
(45) Date of Patent: Feb. 5, 2013

(54) ROTARY TOOL WITH MULTIPLE TOOL ATTACHMENT INTERFACES

(75) Inventors: Siew Yuen Lee, Penang (MY); Mohsein Wan, Bukit Mertajam Penang (MY); Chi Hoe Leong, Bayan Lepas (MY); Manfred Lutz, Filderstadt (DE)

(73) Assignee: Robert Bosch GmbH, Stuttgart (DE)

( * ) Notice: Subject to any disclaimer, the term of this patent is extended or adjusted under 35 U.S.C. 154(b) by 1170 days.

(21) Appl. No.: 12/236,034

(22) Filed: Sep. 23, 2008

(65) Prior Publication Data

US 2009/0079143 A1   Mar. 26, 2009

(30) Foreign Application Priority Data

Sep. 24, 2007   (EP) .................................... 07117056

(51) Int. Cl.
*B23B 31/107* (2006.01)
(52) U.S. Cl. ............. 279/137; 279/79; 279/74; 279/904
(58) Field of Classification Search .................. 279/127, 279/97, 137, 74, 75, 76, 79, 904, 905, 24, 279/22; 7/138
See application file for complete search history.

(56) References Cited

U.S. PATENT DOCUMENTS

| | | | | |
|---|---|---|---|---|
| 2,805,594 A * | 9/1957 | Fogel | ............................... | 81/125 |
| 3,549,160 A * | 12/1970 | Etzkorn | ......................... | 279/97 |
| 4,477,096 A * | 10/1984 | Wallace et al. | ................. | 279/97 |
| 5,309,798 A * | 5/1994 | Markwart et al. | ............. | 81/438 |
| 5,398,946 A | 3/1995 | Quiring | | |
| 5,481,949 A | 1/1996 | Yen | | |
| 5,974,919 A | 11/1999 | Habele | | |
| 6,325,393 B1 * | 12/2001 | Chen et al. | ...................... | 279/22 |
| 8,113,093 B2 * | 2/2012 | Kistner | ......................... | 81/124.5 |
| 2005/0132846 A1 | 6/2005 | Lai | | |
| 2006/0237205 A1 | 10/2006 | Sia et al. | | |

FOREIGN PATENT DOCUMENTS

| | | |
|---|---|---|
| JP | 10-155574 | 6/1998 |
| JP | 2004-190714 | 7/2004 |
| JP | 2006-7389 | 1/2006 |

* cited by examiner

*Primary Examiner* — Daniel Howell
*Assistant Examiner* — Paul M Janeski
(74) *Attorney, Agent, or Firm* — Michael J. Striker

(57) ABSTRACT

A rotary tool has an output shaft having an axis of rotation and a distal neck portion which has at least three neck faces that do not intersect the axis of rotation, and a substantially U-shaped spring element having a base portion and two leg portions, wherein the spring element straddles the distal neck portion.

11 Claims, 6 Drawing Sheets

ROTARY TOOL WITH MULTIPLE TOOL ATTACHMENT INTERFACES

CROSS-REFERENCE TO RELATED APPLICATION

The invention described and claimed hereinbelow is also described in German Patent Applications EP 07117056.7 filed on Sep. 24, 2007. This European Patent Application, whose subject matter is incorporated here by reference, provides the basis for a claim of priority of invention under 35 U.S.C. 119(a)-(d).

BACKGROUND OF THE INVENTION

The present invention relates to rotary tools and in particular to interfaces for attaching different sorts of working members, such as driver bits or sockets, to the shaft of a rotary tool.

Patent application Ser. No. 10/155,574 discloses a hybrid interface that allows one to secure either a driver bit or a socket to rotary tool output shaft. The output shaft is configured to include a hexagonal cavity for receiving a driver bit along with means, such as a ball and sleeve arrangement, for attaching or releasing the bit. The distal end of the output shaft has a square-shaped periphery, and so it is also able to accommodate a typical socket. One embodiment is configured to cooperate with a pin and an O-ring to secure sockets according to a standard used in Japanese markets. A second embodiment employs a spring-loaded protrusion mounted to a hole on the periphery of the output shaft to secure sockets configured with an inner annular groove which is typical of the standard used in North American and European markets.

JP Patent Application No. 2004-190714 discloses a socket attachment interface intended to simplify the attachment of sockets according to the Japanese standard. A detachable spring member is secured with a screw to the end face of the output shaft of a rotary tool and includes one or more protrusions that cooperate with one or more through-holes in the socket.

Accordingly, it is an object of the present invention to provide a rotary tool which is a further improvement of existing rotary tools.

SUMMARY OF THE INVENTION

The present invention provides a hybrid tool attachment interface that incorporates advantages from both of the above-described designs and which can accommodate a driver bit as well as a variety of sockets. The design is simple to manufacture and assemble and does not require additional tools for mounting or removing bits or sockets.

The inventive rotary tool comprises an output shaft having an axis of rotation, a distal neck portion which has at least three neck faces that do not interest the axis of rotation and a generally U-shaped spring element having a base portion and two leg portions, wherein the spring element straddles the distal neck portion.

The U-shaped spring element is securely attached to the output shaft without any separate fastening means and has the advantage that features that can be used to secure multiple types of working members can be embodied in an inexpensively constructed part that is furthermore easily detachable should it be subject to wear or damage and need to be replaced.

The design has the advantage that the output shaft is provided with an elongate cavity coaxial with its axis of rotation, so that it can optionally receive a driver bit, thereby providing additional functionality for the user, who can select from either a driver bit or a socket without needing to use a separate adaptor.

The output shaft is further provided with means for securing a driver bit within the elongate cavity. Preferably these means comprise a slidably-mounted sleeve which is biased by a spring and which cooperates with balls which act as locking members when a driver bit with a circumferential groove is inserted. In this way, the user can easily remove or attach a driver bit of this type without any separate tools.

The spring element of the inventive rotary tool has two tip portions, each of which is contiguous with one of the two leg portions. These two tip portions together with the base portion and the two leg portions embrace the distal neck portion to retain the spring element. Hence the force of the spring and its geometry allow the spring plate to surround and fasten itself to the neck region of the output shaft without the need for separate fastening means. Since it is detachable, the user may optionally remove the spring element for replacement or use with certain tool types.

Each of the two leg portions contacts one of the neck faces of the distal neck portion and this serves to grip around the output shaft to retain the spring element. Preferably the leg portions contact the neck faces within recessed regions of the neck faces. This has the advantage that the spring plate can lie flush with the rest of the distal neck portion to provide an overall generally flat profile for insertion of a socket.

Adjoining the recessed faces of the distal neck portion are elevated portions that serve as stop surfaces. These stop surfaces provide the advantage that the spring plate is prohibited from moving axially along the axis of rotation when a socket is inserted onto or removed from the distal neck portion.

One of the means by which the spring plate retains a socket is by having at least one spring-elastic protrusion on a leg portion. Preferably two such protrusions are present on two leg portions. The protrusions can advantageously mate with either an internal groove or a radial cavity within a socket.

When a socket is inserted, it will generally deflect the spring-elastic protrusion as well as the portions of the spring plate, preferably arms, that surround the protrusion. Therefore it is advantageous to provide cavities extending from each neck face to the elongate cavity to receive each spring-elastic protrusion when they are deflected. It is preferable if there are multiple aspects to the cavity, an internal cylindrical aspect that can be used to mate with a pin inserted through the shaft and the socket, as well as a larger, and preferably conically shaped cavity portion. The larger, conically-shaped portion can accommodate the protrusion and the flexible arms surrounding the protrusion even when the protrusion is maximally deflected.

To allow the same attachment interface to accommodate sockets according to a Japanese standard wherein a pin and O-ring are used to secure the socket, the base portion of the spring element is provided with an opening. The opening is positioned generally coaxially with the cavity in the output shaft so they may cooperate to form an insertion pathway for the pin that is used to secure the socket.

Since protrusions for retaining a socket as well as a pathway for traversing the output shaft with a pin are provided at the same time, the inventive rotary tool can securely attach working members via at least three different means. First, a driver bit can be inserted and retained in the elongate cavity. Second, a socket with an internal groove can be retained via the spring-elastic protrusions. Third, a socket with a radial cavity can be retained not only via the spring-elastic protrusions, but also via cooperation with a pin which traverses an opening in the spring plate and a cavity in the output shaft, so that it can be secured by an O-ring extending around the perimeter of the socket.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
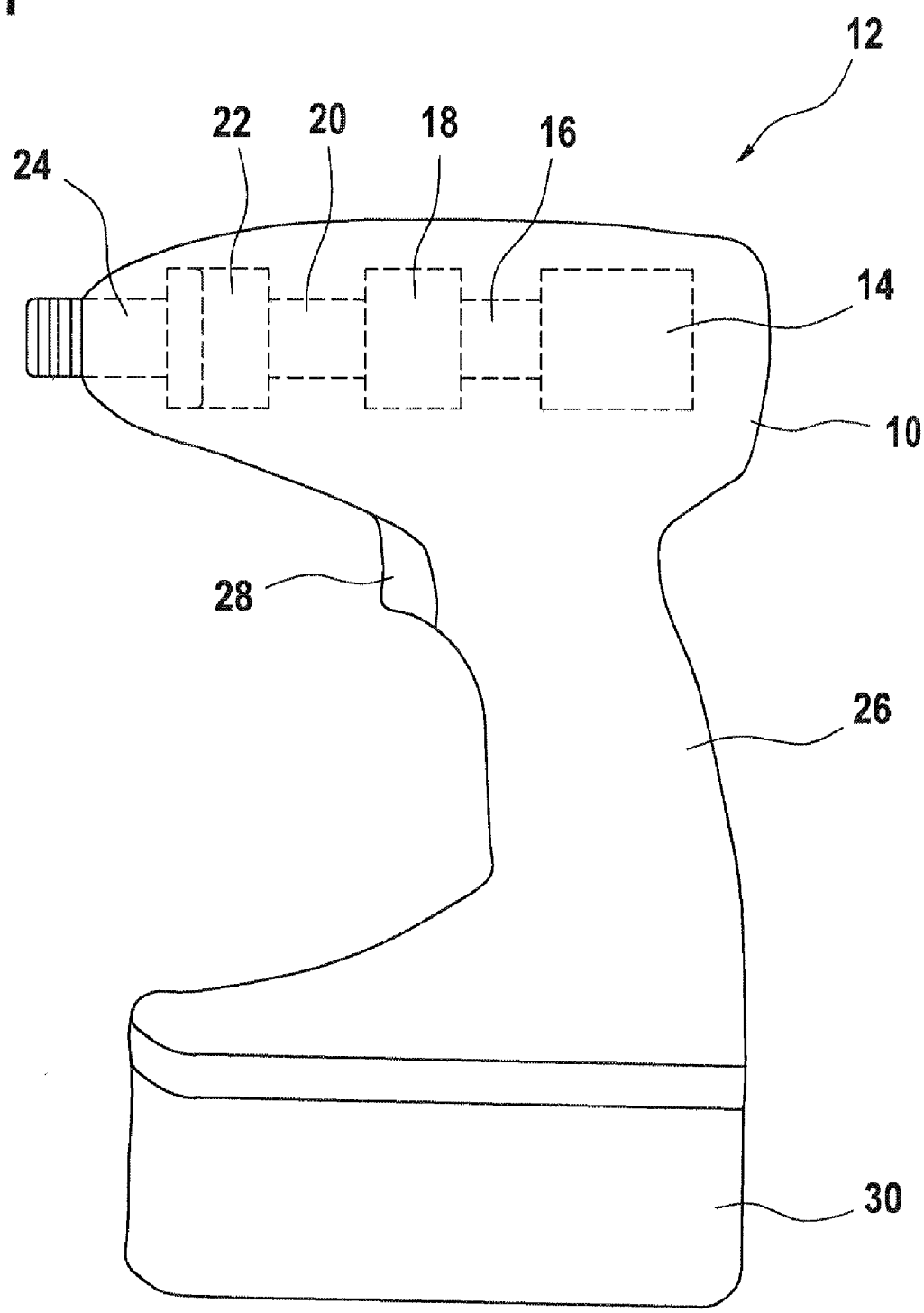
FIG. 1 is a schematic drawing of a side view of a rotary tool according to the present invention, wherein features that are located within the tool housing are indicated with dashed lines.

An example of a rotary tool according to the present invention is illustrated in FIG. 1. While the illustrated embodiment is a power tool, and specifically a cordless impact driver, the invention may be advantageously used with a variety of rotary tools irrespective of whether they are powered or whether they include an impact driving function. Within housing 10 of rotary power tool 12 are a motor 14 and its associated motor shaft 16. A transmission 18 converts the rotation of the motor shaft 16 into increased output torque, but correspondingly reduced speed rotation of the driveshaft 20.

The driveshaft 20 is coupled to a hammer 22 which is in turn coupled to an output shaft 24. The driveshaft 20, hammer 22 and output shaft 24 are configured to transmit repetitive bursts of output torque via a hammer and anvil arrangement as is well known to those skilled in the art. An example of such an impact driver is shown in US 2006/0237205-A1, which is hereby incorporated by reference. The tool is provided with a handle 26 and a trigger 28 so that it may be conveniently operated by a user. The power source is a DC battery 30 in this exemplary cordless tool, but an AC power source is a standard alternative.

Figure 2:
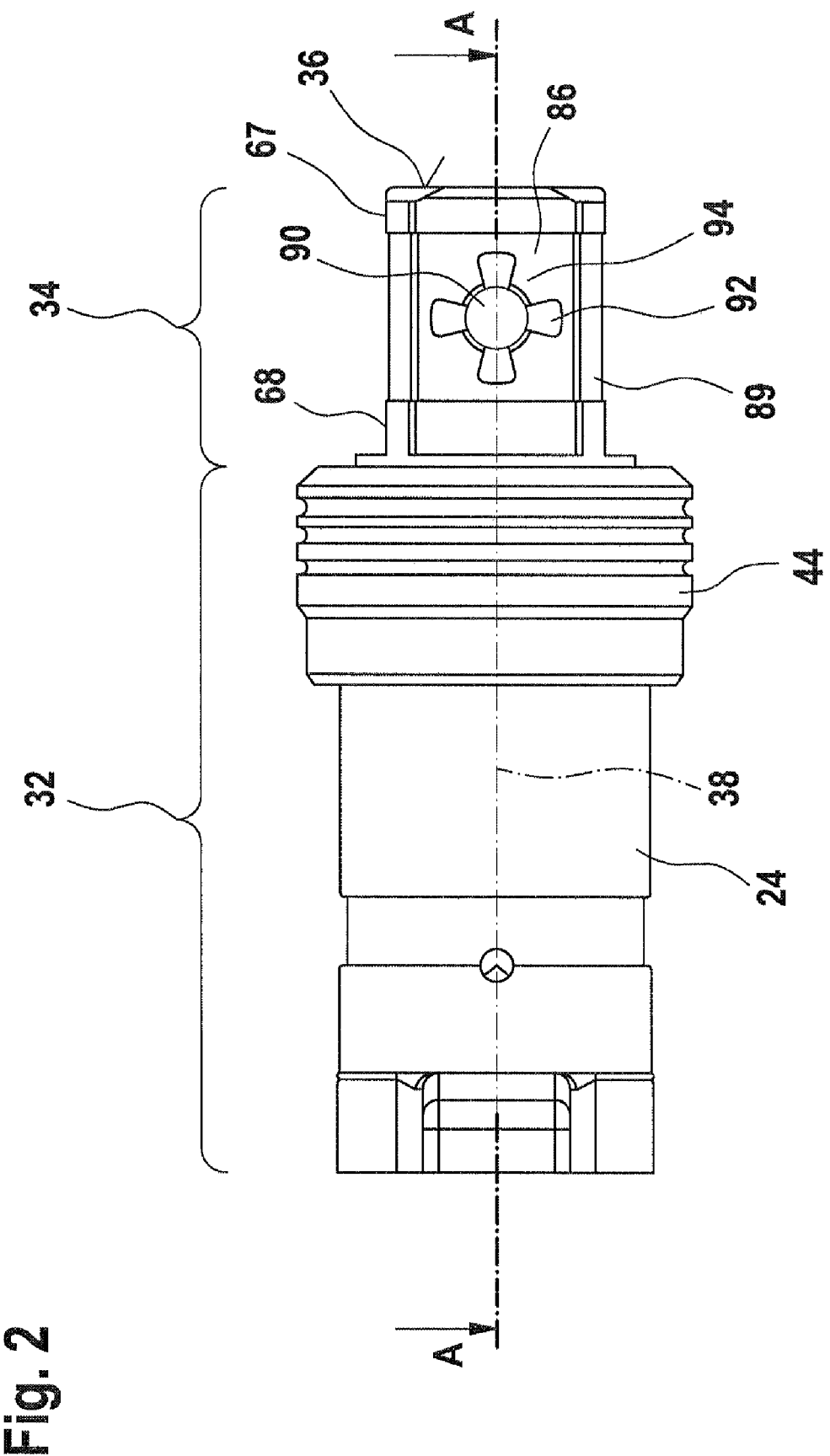
FIG. 2 is a side view of the preferred embodiment of an attachment interface for a rotary tool.
Figure 3:
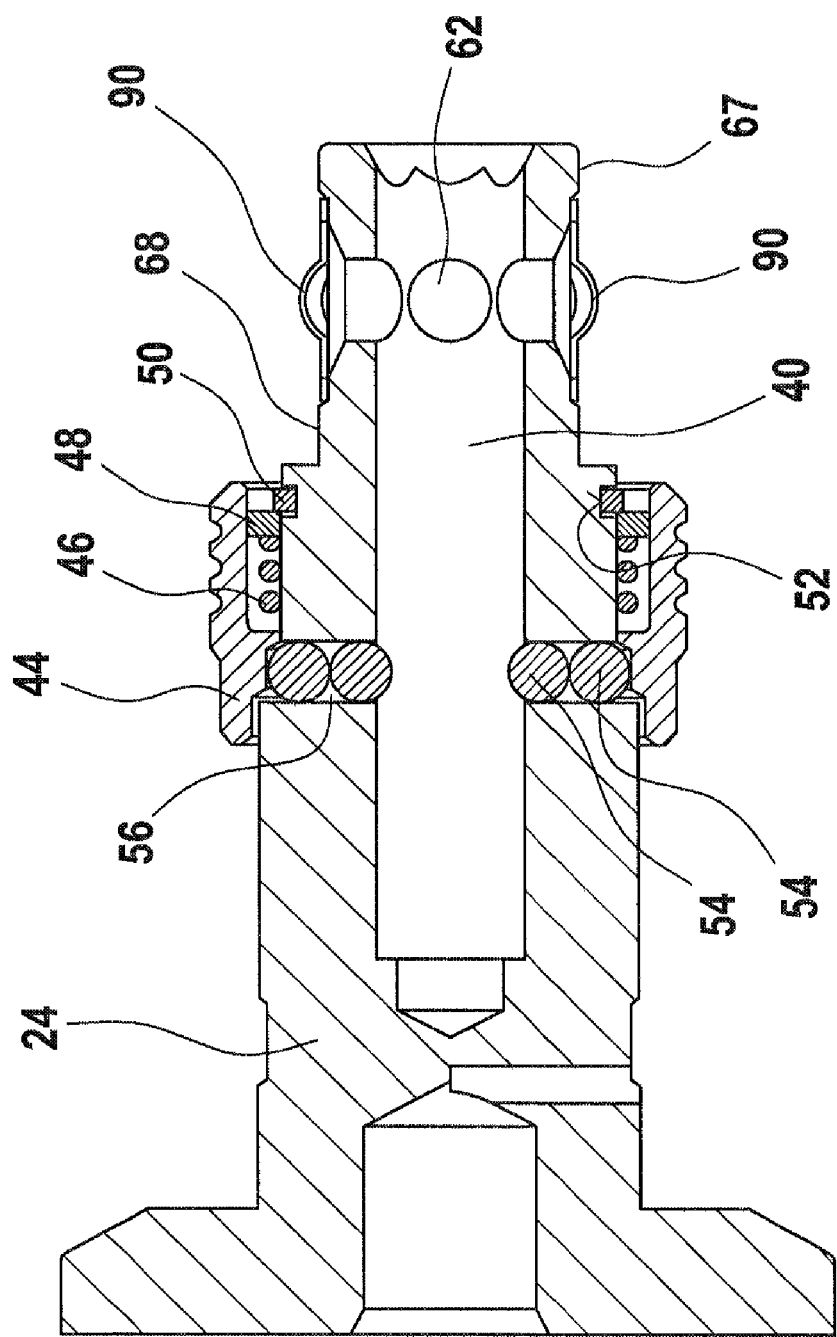
FIG. 3 is a section view of the attachment interface of FIG. 2 taken along section line A-A.
Figure 4:
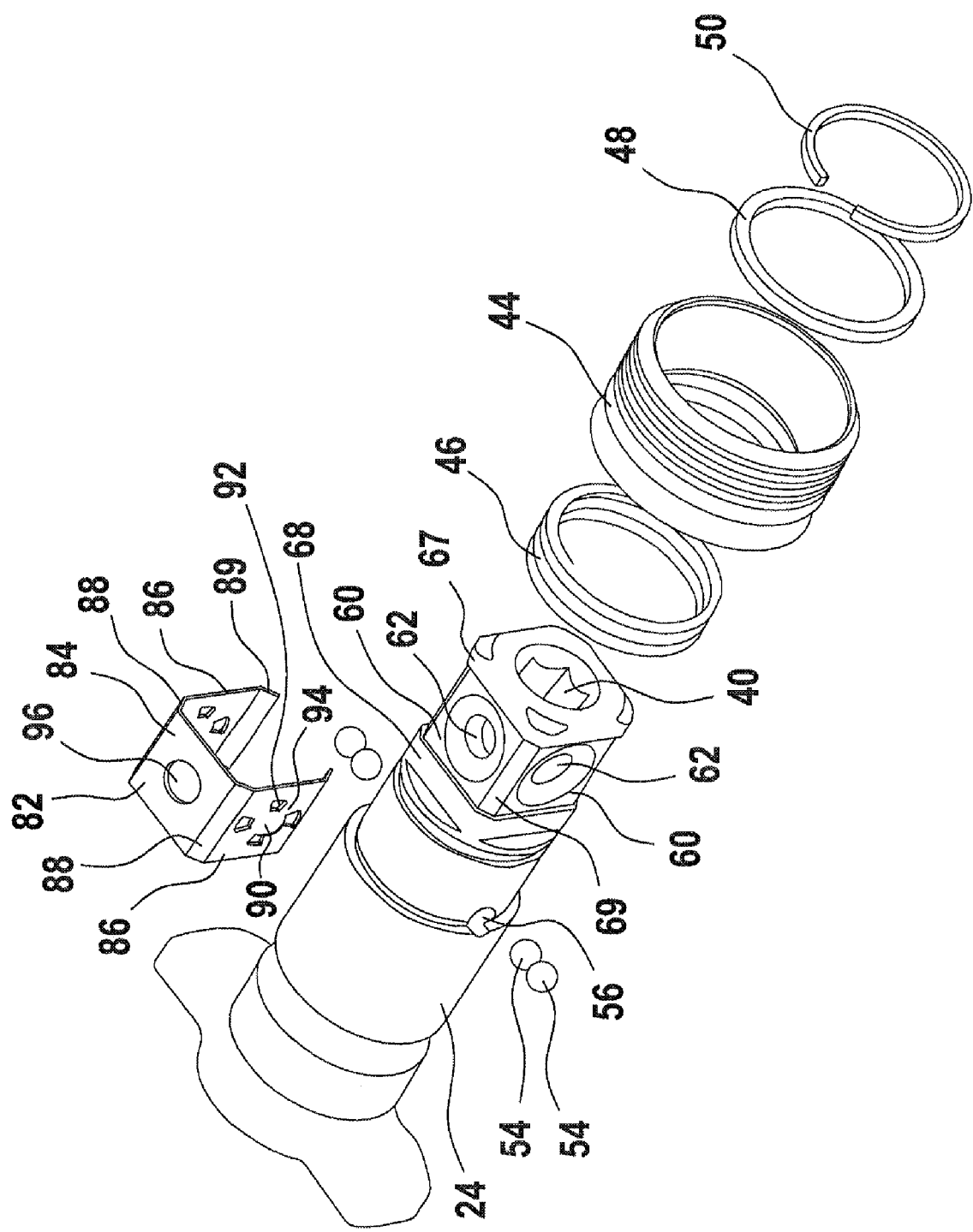
FIG. 4 is an exploded perspective view of an attachment interface.

FIGS. 2-4 show various views of a tool attachment interface for a rotary tool. The output shaft 24 has a proximal neck portion 32, a distal neck portion 34, an end face 36, and an axis of rotation 38. An elongate cavity 40 in the output shaft 24 is centered around the axis of rotation 38. The cavity is preferably polygonally shaped so that it can accommodate a complementary polygonally-shaped driver bit (not shown).

As means for securing a driver bit, a sleeve 44, a compression spring 46, and a retaining ring 48, are mounted around the proximal neck portion 32 of the output shaft 24. All of these elements are secured to the proximal neck portion 32 once a C-ring 50 is inserted into annular groove 52. The force from the spring 46 positions the sleeve 44 such that balls 54 mounted in radial cavities 56 are urged partially into the elongate cavity 40 to act as locking members to act on a hexagonal driver bit with an annular groove (e.g., according to the DIN 3126-E6.3 standard) so that it can be securely attached and released from the output shaft 24.

The radial cavities 56 are sized with a variable diameter, such that the balls 54 may travel within the radial cavities 56 but can only protrude partially into elongate cavity 40. A user can urge the sleeve 44 against the spring force, so that the balls have space enough to exit entirely from the elongate cavity 40. Rather than ball pairs 54, a single ball, an elongate pin, or a blade may alternatively be used as locking members.

Besides these preferred means for retaining a driver bit, many prior art alternatives are also compatible, so long as they can coexist with the socket-retaining means that will be further described. The essential features are that the output shaft 24 is configured with an elongate cavity 40, and the means for securing the driver bit are located within or around the proximal neck portion 32 of the output shaft 24. For example, one or more screws mounted perpendicular to the axis of rotation could also be used to secure the driver bit.

Alternatively, a magnetic part incorporated into the proximal neck portion 32 could be used to attract and retain the driver bit. Furthermore different methods of adjustment are possible. Instead of being biased by the spring 46, the sleeve 44 could instead be threaded to the proximal neck portion 32, so that its position is adjusted via rotation in order to correspondingly position the one or more locking members.

Figure 5:
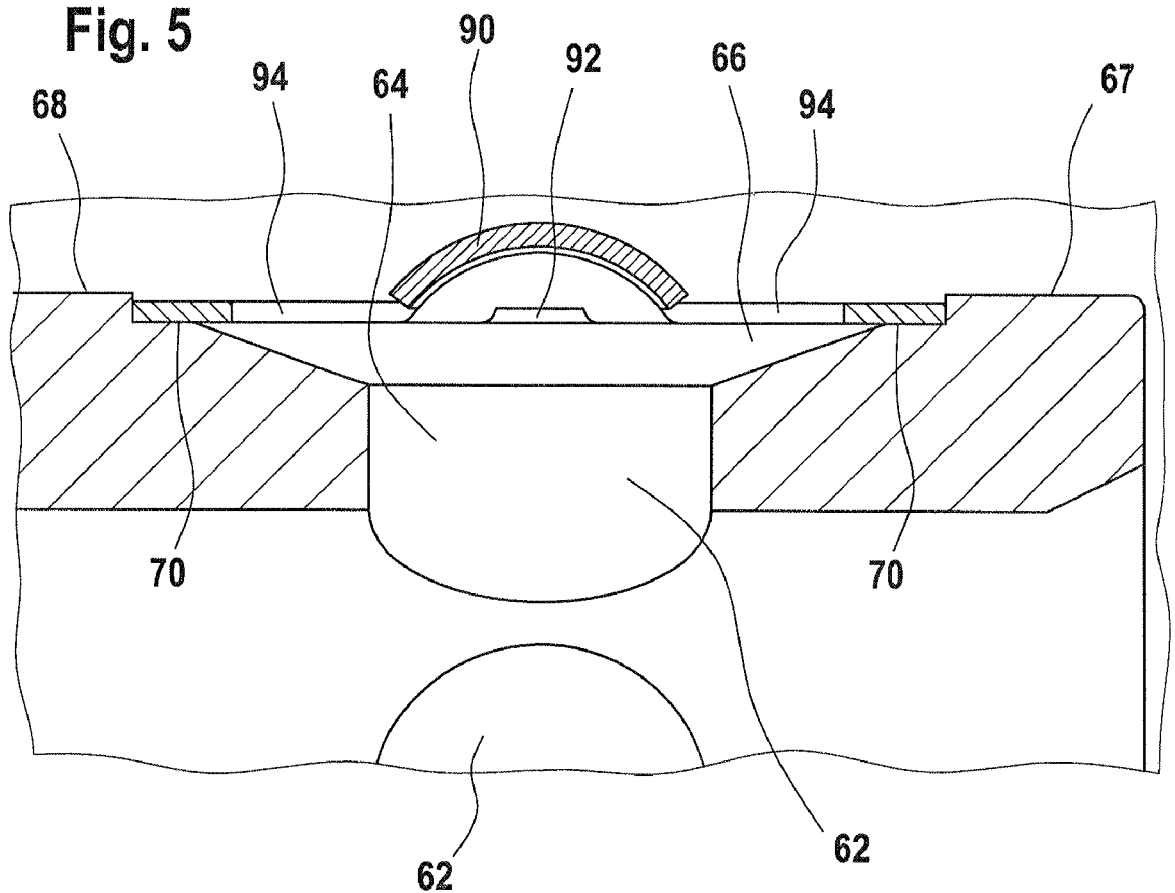
FIG. 5 is a detail section view of FIG. 3.

To accommodate sockets that have a square-shaped female interface, the distal neck portion 34 of the output shaft 24 is preferably square-shaped in a cross-section taken perpendicular to the axis of rotation 38. Detailed features of the distal neck portion 34 are shown in FIGS. 4 and 5. Each of its four neck faces 60 is configured with a neck cavity 62 that traverses the space between the neck face 60 and the elongate cavity 40 and comprises a cylindrical portion 64 and a conical portion 66. The surface of each neck face 60 is partially recessed. Each of four recessed faces 70 are linked by similarly recessed bevel faces 69 at the four corners of the distal neck portion 34. Front 67 and rear 68 elevated portions are found on either side of the recessed faces 70 and bevel faces 69.

Figure 6:
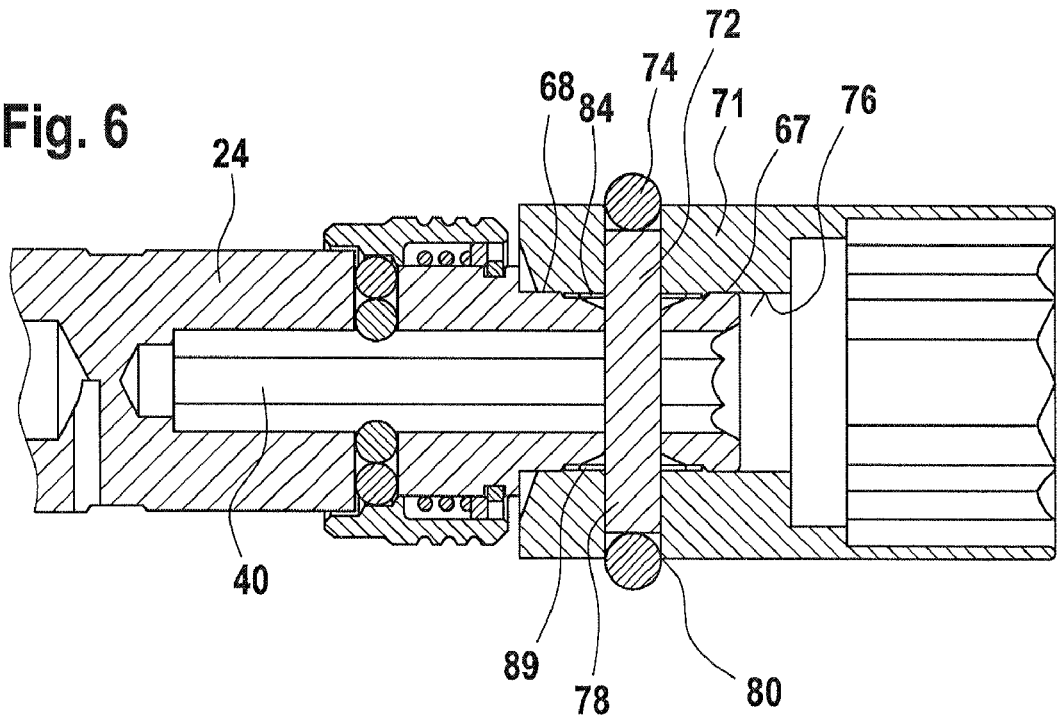
FIG. 6 is a section view of the attachment interface with a socket according to a Japanese standard mounted thereon.

Without any further elements attached, the distal neck portion 34 is sufficient to permit a user to mount and secure a Japanese-type socket 71 to the output shaft 24 using a metal pin 72 and a rubber O-ring 74 as retaining means as is customary for this standard (see FIG. 6). To do so, a socket 71 is mounted onto the output shaft 24 such that each inner face 76 of the socket makes contact with elevated portions 68 of each neck face 60. Then a pin 72 is inserted through radial cavities 78 in the socket and through two neck cavities 62 of the output shaft 24. Finally, an O-ring 74 is mounted around an annular groove 80 of the socket 71 to trap the pin 72.

Note that a given socket 71 can be mounted in any of four possible orientations relative to the output shaft 24, resulting in the mounting pin 72 traversing the socket 71 in one of two possible orientations. In every case, there is no interference from the driver bit mounting means and therefore the two distinct mounting interfaces may coexist on the same output shaft 24.

So that the output shaft 24 can also accommodate different types of sockets, and so that they may be retained without separate fastening members, a spring plate 82 comprising a base portion 84, two leg portions 86, two corner portions 88, and two leg tip portions 89 is preferably mounted to the distal neck portion 34 of the output shaft 24. Each of the two corner portions 88 link the base portion 84 with a leg portion 86. Each of the two leg tip portions 89 extend from the end of the leg portion, that is, they extend from the part of the leg portion 86 opposite the part of the leg portion 86 that interfaces with the base portion 84.

The spring plate 82 is best visualized in the exploded view of FIG. 4. It is fastened to the output shaft 24 without any separate fastening means and does not require the use of tools for attaching or detaching. The cross section of the mounted spring plate 82 taken perpendicular to the axis of rotation 38 (not shown) is substantially U-shaped, as defined by the base portion 84 and the two leg portions 86.

The thickness of the spring plate 82 corresponds very closely to the dimensions of the distal neck portion 34, so that when the spring plate 82 is mounted, each of its portions contacts a recessed face 70 or a bevel face 69, so that it is substantially but not necessarily exactly flush with the surface of the front 67 and rear 68 elevated portions of each neck face 60 (see FIG. 5). These elevated portions 67, 68 provide a stop surface to counter the axial force acting on the spring plate 82 when a socket is inserted or removed.

The two corner portions 88 and the two leg tip portions 89 of the spring plate 82 are complementary to the bevel faces 69 of the distal neck portion 34. As each neck face 60 of the distal neck portion 34 is structurally equivalent, the spring plate 82 can be mounted in any of four possible orientations. The spring plate 82 exerts a spring force which tends to grip the distal neck portion 34 via its two leg tip portions 69. It can be manually removed by overcoming this spring force. The distal neck portion 34 may alternatively have an asymmetrical design, for example with only two neck cavities 62. In this case, the spring plate 82 is preferably inserted in particular orientations.

While the spring force itself comprises sufficient attachment means for retaining the spring plate 82, alternatives are possible. If the spring plate 82 were provided with an opening on one of its faces that corresponded to a cavity on the distal neck portion 34, the parts could be secured with a screw or the like. A suitable screw head would be flat and its head preferably somewhat recessed within the spring plate 82 so as not to interfere with the insertion of a socket. In addition, such a screw should not be long enough to enter the elongate cavity 40 so as to interfere with the mounting of a driver bit.

At the center of each leg portion 86 of the spring plate 82 there is a spring-elastic protrusion 90. Four openings 92 surround the protrusion, thereby establishing four flexible arms 94. Although not absolutely essential features of the spring plate, these openings 92 and arms 94 reduce the force necessary to deflect a protrusion 90 below the surface of the leg portion 86. As will be seen below, this may potentially happen during the insertion of a socket onto the attachment interface. Therefore, a leg portion 86 with two, three, five, six or even more openings can be used towards this same goal and present reasonable alternatives. The spring plate 82 is preferably manufactured through stamping of sheet metal and these openings 92 and arms 94 can be readily introduced during this process.

When it is deflected, each protrusion 90 exerts a radial force generally perpendicular to the axis of rotation 38. When a socket 71 is inserted, its inner face 76 deflects each protrusion 90 while the socket 71 slides into its mounting position, at which time the protrusion 90 acts on a cavity 78 or groove 100 in the socket 71. When the spring plate 82 is mounted to the output shaft 24, the position of each protrusion 90 and flexible arm 94 corresponds roughly to the position of the cylindrical portion 64 and conical portion 66 of the neck cavity 62 respectively. This structure provides sufficient space for the protrusion 90 and flexible arms 94 to be deflected in the general direction of the axis of rotation 38 against its inherent spring force.

Figure 7:
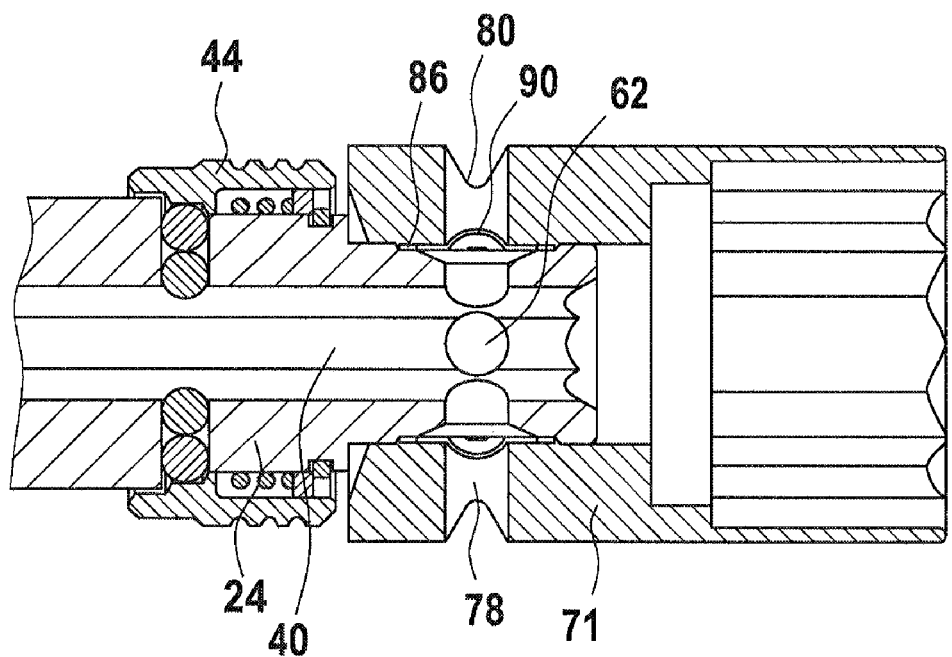
FIG. 7 is a section view of the attachment interface with a socket originally intended for mounting according to a Japanese standard mounted thereon.
Figure 8:
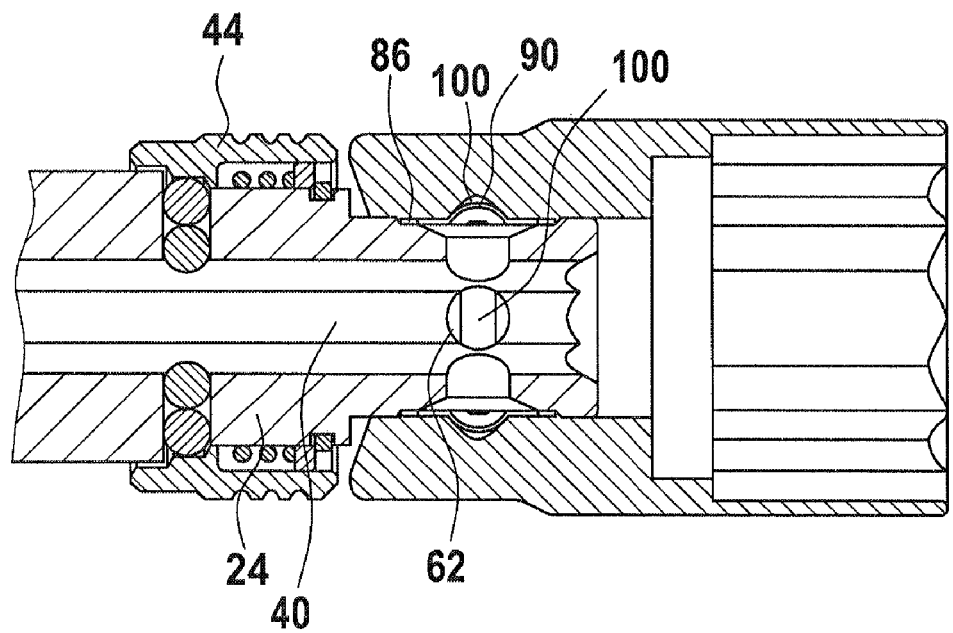
FIG. 8 is a section view of the attachment interface with a socket according to a standard used in North America and Europe mounted thereon.

The base portion 84 of the spring plate 82 has an opening 96 roughly comparable in diameter to that of the cylindrical portion 64 of a neck cavity 62. Since the opening 96 is positioned coaxially with the neck cavity, a pin 72 can be inserted through these features so that a socket 71 can be mounted using a pin 72 and O-ring 74 even when the spring plate 82 is mounted to the output shaft 24. In this configuration, the inner faces 76 of the socket 71 constantly deflect the protrusions 90, but this is permissible since there is adequate space in the neck cavity 92 to accommodate the protrusions 90 as described above. Alternatively and preferably, the same socket 71 could be removed, rotated ninety degrees, and inserted past the spring force of the protrusions 90, so that each protrusion 90 engages with a radial cavity 78 in the socket 71 as shown in FIG. 7. A socket 98 with an internal annular groove 100 is also retained by this attachment interface as shown in FIG. 8.

It will be understood that each of the elements described above, or two or more together, may also find a useful application in other types of constructions differing from the types described above.

While the invention has been illustrated and described as embodied in a rotary tool with multiple tool attachment interfaces, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A rotary tool, comprising
   an output shaft having an axis of rotation and a distal neck portion which has at least two neck faces that do not intersect said axis of rotation; and
   a substantially U-shaped spring element having a base portion and two leg portions, said spring element straddling said distal neck portion;
   wherein said base portion has an opening that is positioned generally coaxially with at least one neck cavity provided in one of the at least two neck faces of said output shaft.

2. A rotary tool as defined in claim 1, wherein said output shaft has an elongate cavity which is coaxial with said axis of rotation for receiving a bit.

3. A rotary tool as defined in claim 2, further comprising means for securing the bit within said elongate cavity.

4. A rotary tool as defined in claim 1, wherein said spring element has two tip portions each extending from one of said two leg portions, said tip portions together with said base portion and said two leg portions embracing said distal neck portion to retain said spring element.

5. A rotary tool as defined in claim 4, wherein each of said two leg portions contacts one of said neck faces of said distal neck portion.

6. A rotary tool as defined in claim 4, wherein at least one of said two leg portions contacts a recessed face of one of the neck faces.

7. A rotary tool as defined in claim 4, wherein at least one of said two leg portions is adjacent to a stop surface on said distal neck portion.

8. A rotary tool as defined in claim 4, wherein at least one of said two leg portions of said spring element has a spring-elastic protrusion.

9. A rotary tool as defined in claim 8, wherein said output shaft has a cavity to receive said at least one spring-elastic protrusion if it is deflected.

10. A rotary tool as defined in claim 9, wherein said cavity has a substantially cylindrical portion and a substantially conical portion.

11. A rotary tool as defined in claim 1, wherein said output shaft is configured so that an element selected from the group consisting of a driver bit, a socket with an internal groove, a socket with a radial cavity cooperating with a pin which traverses a cavity and which is secured in the socket via an O-ring is attachable to said output shaft.

* * * * *